United States Patent
Olson et al.

(10) Patent No.: US 9,189,399 B2
(45) Date of Patent: Nov. 17, 2015

(54) STACK CACHE MANAGEMENT AND COHERENCE TECHNIQUES

(71) Applicant: ADVANCED MICRO DEVICES, INC., Sunnyvale, CA (US)

(72) Inventors: Lena E. Olson, Madison, WI (US); Yasuko Eckert, Kirkland, WA (US); Bradford M. Beckmann, Redmond, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 214 days.

(21) Appl. No.: 13/887,196

(22) Filed: May 3, 2013

(65) Prior Publication Data

US 2014/0143497 A1 May 22, 2014

Related U.S. Application Data

(60) Provisional application No. 61/728,843, filed on Nov. 21, 2012.

(51) Int. Cl.
| | | |
|---|---|---|
| G06F 12/00 | (2006.01) | |
| G06F 12/08 | (2006.01) | |
| G06F 12/12 | (2006.01) | |

(52) U.S. Cl.
CPC ........ G06F 12/0802 (2013.01); G06F 12/0848 (2013.01); G06F 12/0864 (2013.01); G06F 12/0875 (2013.01); G06F 12/123 (2013.01)

(58) Field of Classification Search
None
See application file for complete search history.

(56) References Cited

U.S. PATENT DOCUMENTS

| | | | |
|---|---|---|---|
| 6,038,643 | A | 3/2000 | Tremblay et al. |
| 6,058,457 | A | 5/2000 | Tremblay et al. |
| 6,067,602 | A | 5/2000 | Tremblay et al. |
| 6,092,152 | A | 7/2000 | Tremblay et al. |
| 6,125,439 | A | 9/2000 | Tremblay et al. |
| 6,138,210 | A | 10/2000 | Tremblay et al. |
| 6,532,531 | B1 | 3/2003 | O'Connor et al. |
| 6,950,923 | B2 | 9/2005 | O'Connor et al. |
| 6,961,843 | B2 | 11/2005 | O'Connor et al. |
| 7,702,855 | B2 * | 4/2010 | Rosen et al. ............. 711/132 |
| 2005/0050278 | A1 | 3/2005 | Meier et al. |
| 2007/0038810 | A1 * | 2/2007 | Rosen et al. ............. 711/132 |

OTHER PUBLICATIONS

Rodrigo Gonzalez-Alberquilla et al., "Stack Oriented Data Cache Filtering", Univ. Complutense de Madrid, Ciudad Universitaria s/n, Madird, Spain 28040, CODES + ISSS'09, Oct. 11-16, 2009.
Power Point Presentation "Cache Coherency" CSE P548—Cache Coherence; Autumn 2006.

(Continued)

Primary Examiner — Brian Peugh

(57) ABSTRACT

A processor system presented here has a plurality of execution cores and a plurality of stack caches, wherein each of the stack caches is associated with a different one of the execution cores. A method of managing stack data for the processor system is presented here. The method maintains a stack cache manager for the plurality of execution cores. The stack cache manager includes entries for stack data accessed by the plurality of execution cores. The method processes, for a requesting execution core of the plurality of execution cores, a virtual address for requested stack data. The method continues by accessing the stack cache manager to search for an entry of the stack cache manager that includes the virtual address for requested stack data, and using information in the entry to retrieve the requested stack data.

22 Claims, 5 Drawing Sheets

(56) References Cited

OTHER PUBLICATIONS

Hsien-Hsin S. Lee et al., "Stack Value File: Custom Microarchitecture for the Stack", Advanced Computer Architecture Lab, University of Michigan, Jan. 2001.

www.codeproject.com., Shivprasad Koirala, "Six important. Net concepts: Stack, heap, value types, reference types, boxing, and unboxing", Article Published May 14, 2012.

Koji Inoue et al., "Way-Predicting Set-Associative Cache for High Performance and Low Energy Consumption", Department of Computer Science and Communication Engineering Kyushu Univeristy, Kasuga-Koen, Kasuga, Fukuoka, Japan ISLPED99, 1999.

Michael D. Powell, et al., "Reducing Set-Associative Cache Energy via Way-Prediction and Selective Direct-Mapping", School of Electrical and Computer Engineering, Purdue University, Proceedings of the 34th Intl Symposium on Microarchitecture (MICRO), 2001.

Basu, A.; Hill, M.D.; Swift, M.M.; "Reducing memory reference energy with opportunistic virtual caching, " Computer Architecture (ISCA), 2012 39th Annual International Symposium on , vol., No., pp. 297-308, Jun. 9-13, 2012.

* cited by examiner

| Entry 200 | Virtual Page 202 | Physical Address 204 | Core ID 206 |
|---|---|---|---|
| 0 | VP-0 | PA-0 | Core-1 |
| 1 | VP-1 | PA-1 | Core-3 |
| 2 | VP-2 | PA-2 | Core-1 |
| 3 | VP-3 | PA-3 | Core-4 |
| 4 | VP-4 | PA-4 | Core-2 |
| ... | ... | ... | ... |
| N | VP-N | PA-N | Core-2 |

STACK CACHE MANAGEMENT AND COHERENCE TECHNIQUES

CROSS-REFERENCE TO RELATED APPLICATION

This application claims the benefit of U.S. provisional patent application No. 61/728,843, filed Nov. 21, 2012 (the entire content of this provisional application is incorporated by reference herein).

TECHNICAL FIELD

Embodiments of the subject matter described herein relate generally to memory caches of the type found in processor systems. More particularly, embodiments of the subject matter relate to the management of stack caches that are utilized for stack data in a processor system.

BACKGROUND

A central processing unit (CPU) may include or cooperate with one or more cache memories to facilitate quick access to data (rather than having to access data from the primary system memory). Memory latency, relative to CPU performance, is ever increasing. Caches can alleviate the average latency of a load operation by storing frequently accessed data in structures that have significantly shorter latencies associated therewith. Moreover, memory subsystem performance can be increased by storing the most commonly used data in smaller but faster cache memories. For example, "stack data" (i.e., frequently used and/or recently accessed data) may be cached in small stack caches that are distinct from the traditional and typical cache memory hierarchy of a processor system.

In a typical multicore processor system, stack data is "owned" or accessed by only one execution core at a time. In other words, stack data is usually private in nature. That said, there are certain situations where stack data is shared between different execution cores. Consequently, stack caches in a multicore processor system should be kept coherent and should be managed in an efficient and effective manner.

BRIEF SUMMARY OF EMBODIMENTS

A method of managing stack data in a processor system having a plurality of execution cores and a plurality of stack caches is provided here. Each of the stack caches is associated with a different one of the execution cores. The method maintains a stack cache manager for the plurality of execution cores, wherein the stack cache manager includes entries for stack data accessed by the plurality of execution cores. The method continues by processing, for a requesting execution core of the plurality of execution cores, a virtual address for requested stack data. The method continues by accessing the stack cache manager to search for an entry of the stack cache manager that includes the virtual address for requested stack data, and using information in the entry to retrieve the requested stack data.

Also provided is a processor system having a plurality of execution cores, a plurality of stack caches configured to cache stack data for the execution cores, a plurality of stack translation lookaside buffers (TLBs) for the execution cores, a cache memory architecture, and a stack cache manager. Each of the execution cores has one of the stack caches associated therewith, and each of the plurality of stack caches has one of the stack TLBs associated therewith. The cache memory architecture is configured to cache data for the execution cores. The stack cache manager is operatively associated with the execution cores and is operatively associated with the stack caches and the stack TLBs, wherein the stack cache manager maintains status entries for stack data accessed by the execution cores.

Also provided is a method of managing stack data in a processor system having a plurality of execution cores, a plurality of stack caches, a plurality of stack TLBs, and a stack cache manager. Each of the execution cores has one of the stack caches associated therewith, each of the stack caches has one of the stack TLBs associated therewith, and each of the stack caches is associated with a different one of the execution cores. The method maintains, with the stack cache manager, status entries for stack data accessed by the execution cores. The method continues by obtaining an access request for requested stack data, the access request originating from a first execution core of the plurality of execution cores, and the access request identifying a virtual memory address for the requested stack data. The first execution core is associated with a first stack cache of the plurality of stack caches and is associated with a first stack TLB of the plurality of stack TLBs. The method continues by determining that the requested stack data cannot be found in the first stack cache, and that an address translation for the virtual memory address cannot be found in the first stack TLB. In response to the determining, the method searches the stack cache manager to locate a status entry for the requested stack data, and retrieves the requested stack data in response to locating the status entry for the requested stack data.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, logic elements, look-up tables, or the like, which may carry out a variety of functions under the control of one or more microprocessors or other control devices.

Moreover, when implemented in software or firmware, the methods, processes, and/or tasks described herein may be associated with code segments or instructions that perform the various tasks. The program or code segments can be stored in a tangible processor-readable medium (e.g., a non-transitory medium). The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, or the like.

The subject matter presented here relates to a processor system and associated cache memory architectures, cache management techniques, and cache coherency techniques. The processor system can be realized as a semiconductor chip, product, or package. Such processor systems are widespread and commonly used in many computer systems and electronic applications. Accordingly, for the sake of brevity, conventional techniques, aspects, and features of computer systems, processor systems, and cache memory systems will not be described in detail herein.

Figures 1, 2:
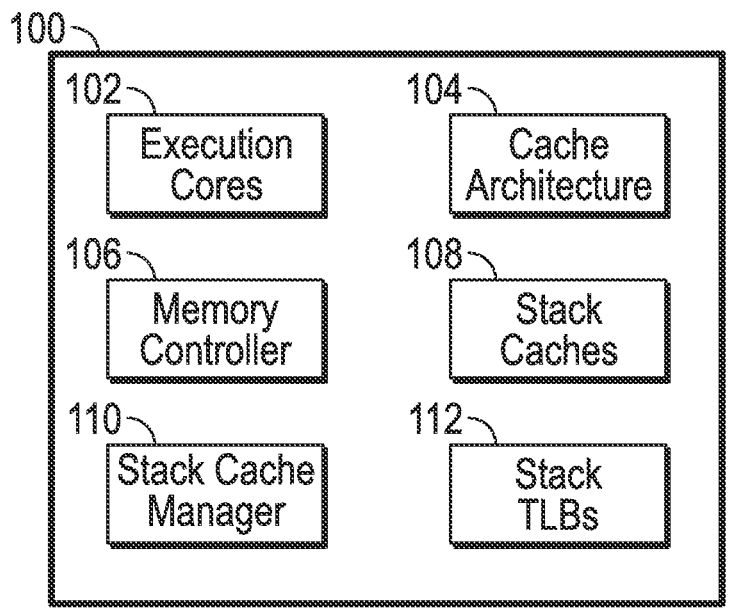
FIG. 1 is a simplified block diagram of an embodiment of a processor system.
FIG. 2 is a table that includes status entries for a stack cache manager.

Referring now to the drawings, FIG. 1 is a simplified block diagram of a processor system 100. In accordance with some embodiments, the processor system 100 may include, without limitation: a plurality of execution cores 102; a cache architecture 104; at least one memory controller 106; a plurality of stack caches 108; at least one stack cache manager 110; and a plurality of stack translation lookaside buffers 112. These elements and features of the processor system 100 may be operatively associated with one another, coupled to one another, or otherwise configured to cooperate with one another as needed to support the desired functionality—in particular, the stack cache management functionality described herein. For ease of illustration and clarity, the various physical, electrical, and logical couplings and interconnections for these elements and features are not depicted in FIG. 1. Moreover, it should be appreciated that embodiments of the processor system 100 will include other elements, modules, and features that cooperate to support the desired functionality. For simplicity, FIG. 1 only depicts certain elements that relate to the stack cache management techniques described in more detail below.

Each of the execution cores 102 represents a processing unit that is designed and configured to execute computer-readable instructions, which are stored in some type of accessible memory. In accordance with conventional multicore technology, each of the execution cores 102 is capable of executing process threads in an independent manner. The cache architecture 104 is coupled to the execution cores 102, and provides a cache memory hierarchy for the execution cores 102. Accordingly, the cache architecture 104 is suitably configured to cache data for the execution cores as needed, and in accordance with any number of conventional caching methodologies. In operation, the execution cores 102 issue demand requests for data, and the cache architecture 104 may be searched in response to demand requests to determine if the requested data is cached.

The memory controller 106 may function as an interface between the processor system 100 and the system memory or main memory (not shown in FIG. 1) of the host computer system. The memory controller 106 is operatively associated with the cache architecture 104 such that the memory controller 106 can control data caching operations that involve the cache architecture 104. In this regard, the memory controller 106 may be responsible for loading cache lines into the cache architecture 104 as needed. The memory controller 106 may also be involved when cached data is evicted from the cache architecture 104 to the system memory, as is well understood. Moreover, the memory controller 106 may be further configured to control data caching operations that involve the stack caches 108.

In some embodiments, multiple stack caches 108 are utilized to support the plurality of execution cores 102. For example, the stack caches 108 may be assigned to or designated for the execution cores 102 such that each execution core 102 is associated with one and only one stack cache 108. In other embodiments, however, more than one stack cache 108 could be associated with a single execution core 102. In yet other embodiments, a single stack cache 108 could be associated with two different execution cores 102. It should be appreciated that the stack caches 108 could be implemented as part of the cache architecture 104. FIG. 1 depicts the stack caches 108 and the cache architecture 104 as distinct modules for ease of description and clarity.

The stack caches 108 are suitably configured to store/cache frequently-used stack data for the execution cores 102 (ideally, the stack caches 108 will not be used for non-stack data). In certain embodiments, each stack cache 108 is virtually indexed and virtually tagged. Thus, stack data contained in the stack caches 108 can be located and retrieved using a suitable virtual addressing scheme.

In some embodiments, multiple stack TLBs 112 are utilized to support the plurality of execution cores 102. For example, the stack TLBs 112 may be assigned to or designated for the execution cores 102 such that each execution core 102 is associated with one and only one stack TLB 112. In other embodiments, however, more than one stack TLB 112 could be associated with a single execution core 102. In yet other embodiments, a single stack TLB 112 could be associated with two different execution cores 102. The stack TLBs 112 are utilized to store virtual-to-physical address translations for stack data, which may be virtually indexed and virtually tagged in certain implementations. If an access request for designated stack data cannot be found in the identified stack cache 108, then the corresponding stack TLB 112 will be searched in an attempt to locate the virtual address of the designated stack data. In this regard, the stack TLBs 112 function in a manner that is similar to traditional TLBs that support non-stack data. It should be appreciated that the stack TLBs 112 could be implemented as part of the cache architecture 104. FIG. 1 depicts the stack TLBs 112 and the cache architecture 104 as distinct modules for ease of description and clarity.

The stack cache manager 110 is maintained and updated for the execution cores 102. In accordance with some embodiments, only one stack cache manager 110 is utilized to support the multiple execution cores 102. In other embodiments, however, more than one stack cache manager 110 could be deployed. As described in more detail below, the stack cache manager 110 represents a centralized page or table that keeps track of the stack data handled by the processor system 100, regardless of which execution core 102 owns the stack data. In this regard, the stack cache manager 110 may include or maintain status entries for the stack data accessed by the execution cores 102, where each entry is associated with or otherwise indicates a memory location for stack data. At least some of the entries in the stack cache manager 110 correspond to entries found in the stack TLBs 112. Accordingly, the stack cache manager 110 may be operatively associated with the execution cores 102, the stack caches 108, and the stack TLBs 112 as needed to support the techniques and methodologies described herein. As explained in more detail below, the status entries in the stack cache manager 110 can be used to maintain coherence for the stack data across the stack caches 108 and across the cache architecture 104.

FIG. 2 is a table 200 that includes several status entries for the stack cache manager 110. The table 200 may include any number of status entries for any number of the execution cores 102, and the illustrated table 200 is merely one possible example. As shown in FIG. 2, each entry in the table 200 includes, without limitation: a virtual page field 202; a physical address field 204 (which is an optional field); and an execution core (or stack) identifier field 206. The virtual page field 202 indicates the virtual memory page for the stack data corresponding to the particular entry. The physical address field 204 indicates the physical memory address for the stack data corresponding to the particular entry. Note that the physical address field 204 is optional because if there is a match in the virtual page field 202, the physical address can be obtained by accessing the TLB of the owner stack. Thus, each entry in the table 200 includes a virtual-to-physical address translation or mapping for stack data. In this regard, each entry in the table 200 is similar to a corresponding entry in one of the stack TLBs 112. Indeed, the table 200 may include copies of the stack TLB entries that indicate the virtual pages for the stack data accessed by the execution cores 102.

Each of the status entries in the table 200 corresponds to designated stack data that is currently owned by one of the plurality of execution cores 102 (i.e., an owner execution core). The execution core identifier field 206 indicates the owner execution core for the designated stack data corresponding to the given entry. For example, Entry 0 in the table 200 is for stack data currently owned by Core_1, Entry 1 is for stack data currently owned by Core_3, and so on. For an embodiment with multiple stack caches per execution core, the field 206 may specify which stack cache owns the virtual page. Notably, the table 200 may include any number (including zero) of status entries for each of the multiple execution cores 102. Thus, the table 200 may be considered to be a "master" TLB for the processor system 100. The status entries in the table 200 may be updated in an ongoing manner to reflect the current memory locations and ownership of the stack data and to maintain stack data coherence.

Figure 3:
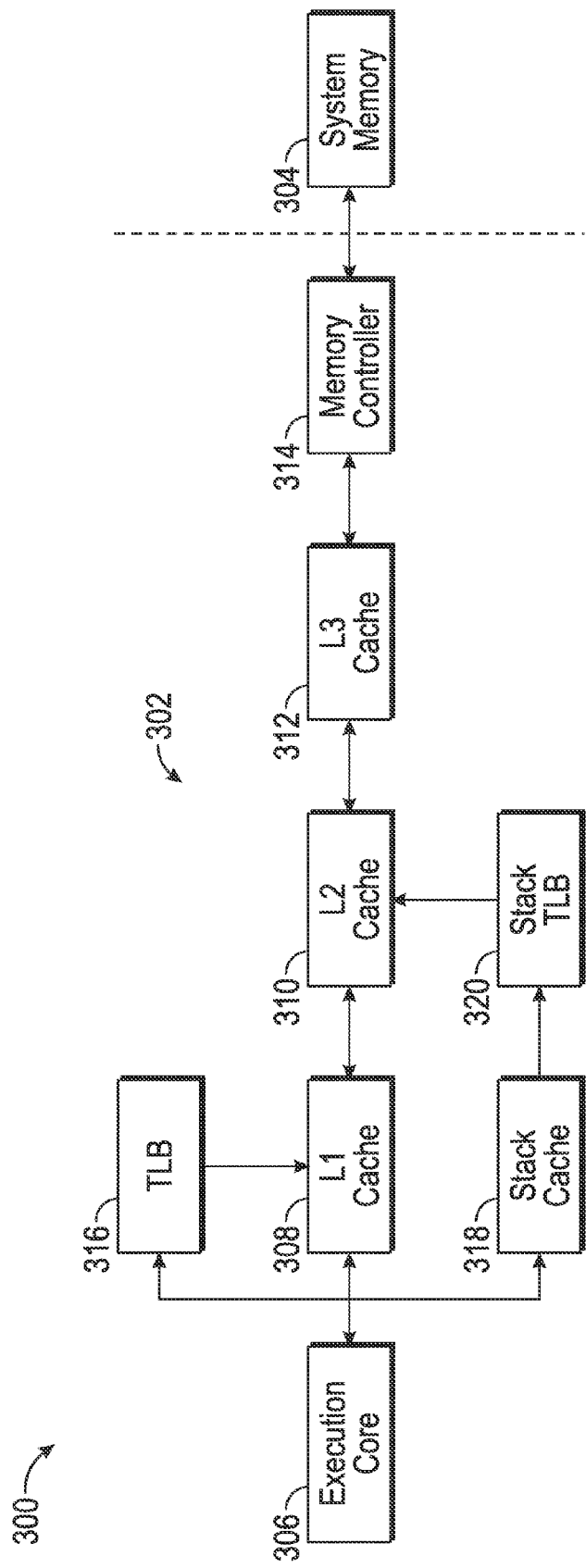
FIG. 3 is a schematic block diagram representation that depicts an embodiment of a processor system.

FIG. 3 is a schematic block diagram representation that depicts an embodiment of a processor system 300. The processor system 300 shown in FIG. 3 may be consistent with the arrangement of the processor system 100 shown in FIG. 1. In other words, the processor system 300 may represent an alternative depiction and arrangement of the elements and features described above for the processor system 100. In this regard, certain features, elements, and functionality of the processor system 100 will not be redundantly described again in the context of the processor system 300.

FIG. 3 depicts a simplified rendition of the processor system 300, which may include a processor device 302 and system memory 304 coupled to the processor device 302. The dashed vertical line in FIG. 3 is intended to represent the typical physical demarcation between the processor device 302 and the system memory 304. In accordance with certain embodiments, the processor device 302 includes, without limitation: an execution core 306; a level one (L1) cache memory 308; a level two (L2) cache memory 310; a level three (L3) cache memory 312; a memory controller 314; a translation lookaside buffer (TLB) 316; a stack cache 318; and a stack TLB 320.

The cache memories 308, 310, 312 may form part of the cache architecture 104 shown in FIG. 1. The cache memories 308, 310, 312 are coupled to the execution core 306, and are coupled together to form a cache hierarchy, with the L1 cache memory 308 being at the top of the hierarchy and the L3 cache memory 312 being at the bottom. The execution core 306 may represent an execution core or unit that issues demand requests for data. Responsive to demand requests issued by the execution core 306, one or more of the cache memories 308, 310, 312, the TLB 316, the stack cache 318, and/or the stack TLB 320 may be searched to locate the requested data. If the data is found, then the requested data can be provided to the execution core 306.

As explained above in the context of FIG. 1, the processor system 300 may include a plurality of different execution cores 306. FIG. 3 depicts only one execution core 306 for clarity and ease of description. In practice, therefore, one or more of the cache memories 308, 310, 312 may be shared between two or more execution cores 306. For example, in some embodiments, two execution cores 306 may share the L3 cache memory 312, while each individual execution core 306 may have separate, dedicated instances of the L1 cache memory 308 and the L2 cache memory 310. Other arrangements are also possible and contemplated.

The example presented here assumes that the execution core 306 is associated with a respective stack cache 318 and a respective stack TLB 320. In certain implementations, the stack TLB 320 may be realized as part of the "main" TLB 316 for the particular execution core 306. Moreover, the TLB 316 could be individually associated with the execution core 306, or it could be shared by a plurality of different execution cores 306 as appropriate to the particular embodiment. This description refers to a simple and straightforward implementation where each individual execution core 306 includes its own corresponding stack cache 318 and its own corresponding stack TLB 320. Accordingly, the processor system 300 may actually have multiple instantiations of some of the elements depicted in FIG. 3, such that multiple execution cores 306 can be supported in the desired manner.

The processor device 302 also includes the memory controller 314, which provides an interface between the processor device 302 and the system memory 304. The memory controller 314 may also be coupled to each of the cache memories 308, 310, 312. During operation, the memory controller 314 may load cache lines (i.e., blocks of data stored in a cache memory) directly into any one or all of the cache memories 308, 310, 312. In some embodiments, the memory controller 314 may load a cache line into one or more of the cache memories 308, 310, 312 responsive to a demand request by the execution core 306 and resulting cache misses in each of the cache memories 308, 310, 312. Similarly, the memory controller 314 may influence the operation of the stack cache 318 as needed.

The TLB 316 functions in accordance with conventional methodologies to handle virtual memory addresses. In this regard, the TLB 316 represents a memory structure that stores virtual-to-physical address translations for the processor system 300. The TLB 316 is utilized in certain embodiments that process virtual addresses from a load/store unit (not shown in FIG. 3). The TLB 316 can be used to obtain physical addresses as needed to locate requested data that resides in the L1 cache memory 308. For example, assume that the L1 cache memory 308 is virtually indexed and physically tagged. In accordance with such an addressing scheme, data located in the L1 cache memory 308 can be obtained with a virtual address component (for the virtual index) and a physical address component (for the physical tag). The TLB 316 is suitably configured to provide the virtual-to-physical translation required to obtain the physical address component. For this reason, FIG. 3 depicts the TLB 316 in parallel with the L1 cache memory 308; these two memory structures may be accessed concurrently because the virtual address component from the execution core 306 need not be translated. In alternative implementations, the TLB 316 could be accessed before accessing the L1 cache memory 308, however, performance is improved using the parallel arrangement depicted in FIG. 3.

For purposes of this description, it is assumed that L1 caches are virtually indexed and physically tagged (in accordance with typical systems). In other embodiments, however, other indexing and tagging schemes could be utilized. Indeed, the indexing and tagging scheme of the L1 caches is unimportant for purposes of the subject matter presented here, and the use of a virtually indexed and physically tagged L1 cache memory 308 is not intended to limit or otherwise restrict the application or scope of this disclosure.

The stack cache 318 represents one of the stack caches 108 shown in FIG. 1, and the stack TLB 320 represents one of the stack TLBs 112 shown in FIG. 1. As depicted in FIG. 3, the stack cache 318 may be arranged in parallel with the L1 cache memory 308 such that the processor system 300 can access stack data (which may be located in the stack cache 318) or non-stack data (which may be located in the L1 cache memory 308) in an efficient manner in response to a stack access request. This example assumes that the stack cache 318 is virtually indexed and virtually tagged. Accordingly, stack data that is present in the stack cache 318 can be accessed without having to perform a virtual-to-physical address translation. The stack TLB 320 is utilized in a manner similar to that described above for the TLB 316. More specifically, the stack TLB 320 is only accessed and searched when the requested stack data cannot be found in the stack cache 318 (i.e., there is a miss in the corresponding stack cache 318). In such situations, the stack TLB 320 can be searched in an attempt to locate the virtual address of the requested stack data and, if the virtual address is found, the corresponding physical address can be utilized to locate the requested stack data in the cache hierarchy. Thus, FIG. 3 depicts the stack TLB 320 leading to the L2 cache memory 310 (because it is assumed that the L2 cache memory 310 will be accessed if there is a hit in the stack TLB 320).

In certain embodiments, the stack caches 108, 318 are virtually addressed (virtually indexed and virtually tagged), and they are normally private such that each stack cache stores data for use by one and only one execution core 102, 306. That said, the stack caches 108, 318 should be kept coherent with the cache architecture 104 such that the processor system can handle situations where the "ownership" of stack data has migrated from one execution core to another. One way to achieve such coherency is to snoop the stack caches 108, 318. Snooping the stack caches 108, 318, however, would require reverse address translations (physical-to-virtual), and would rarely result in coherence hits, where a "coherence hit" occurs when data requested by a requesting execution core is actually found in a memory structure associated with a different execution core. For example, assume that a thread running on a first core utilizes stack data resident in the stack cache of the first core, but the thread migrates to a second core. When the second core requests the stack data for the migrated thread, there will be a miss in the stack cache of the second core because the stack data still resides in the stack cache of the first core.

Accordingly, the processor systems presented here utilize the stack cache manager 110 to keep track of all stack TLB entries, along with which execution core owns the stack page at any given moment. Thus, during a page walk operation, the stack cache manager 110 can be checked and, in the rare case when the page is owned by a different execution core, the stack cache of the previous execution core can be flushed to maintain coherence without the overhead of coherence traffic that would otherwise result from conventional cache coherence approaches.

As mentioned above, the stack caches 108, 318 store the stack data using a virtual addressing scheme. Accordingly, address translation is not required when the stack caches 108, 318 are accessed (due to the use of virtual addressing by the load/store units of the execution cores 102, 306). Rather, address translation is utilized on eviction or stack cache misses. Moreover, although stack data is usually private, there can be situations where stack data might be shared. Accordingly, the stack caches 108, 318 should be kept coherent. Maintaining coherence by means of reverse address translations (physical to linear) and snooping the stack caches 108, 318 on every coherence request requires an undesirable amount of energy, and rarely results in a coherence request hit. The methodology presented here uses less energy and less coherence traffic.

In practice, the stack caches 108, 318 need not be very large. For example, a stack cache could be configured such that it can only hold a few or several cache lines. Moreover, a typical stack cache stores a small set of virtual addresses over a long period of time; the stack is used over and over again to support a given process or thread. Therefore, there should be few invalidations due to coherence and, accordingly, stack cache flushing should be relatively infrequent.

Due to the virtual addressing scheme utilized with the stack caches 108, 318, address translation for stack data is performed for at least the following conditions: (1) on a stack cache miss; and (2) on a writeback to the L2 cache memory. In response to a stack cache miss, the processor system performs a lookup into the stack TLB. If the virtual-to-physical address translation exists (i.e., a TLB hit), then the system accesses the L2 cache memory or the lower-level cache hierarchy to find the data. If the translation does not exist in the stack TLB (i.e., a TLB miss), then the stack cache manager 110 is accessed. For a writeback to the L2 cache, the processor system would access the TLB entry.

The methodology described in more detail herein is intended to eliminate the need to perform a reverse address translation on each coherence request (which is by physical address). Rather than snooping the stack cache on every coherence request, which requires a physical-to-virtual translation, the stack cache manager 110 is maintained and updated with the virtual addresses of stack pages owned by the different execution cores in the system, along with which core is the "owner" core for the stack data. The size of the stack cache manager 110 will depend upon the size of the stack TLBs 112, 320 assigned to each of the execution cores 102, 306. In practice, the size of the stack cache manager 110 may be bounded by the combined size of the stack TLBs 112, 320 for all of the execution cores 102, 306. Use of the stack cache manager 110 in the manner described herein results in a reduction of coherence traffic.

In response to a TLB miss from a different core (whether to a stack page or a non-stack page), the page walker consults the stack cache manager 110 to ensure that an inserted virtual-to-physical address translation does not conflict with a current virtual address page maintained by the stack cache manager 110. If there is such a conflict, the stack cache manager 110 is updated, and a shoot-down is sent to the stack TLB for the owning execution core. This entry is invalidated and the stack cache (or at least all entries from that page) is flushed. Notably, a flush of an entire stack cache is not unreasonable or unrealistic because each stack cache is envisioned to be relatively small and often only containing lines from a single page.

In certain implementations, a TLB lookup is performed when allocating a new cache entry in any of the caches (whether part of the traditional cache architecture 104 or the stack caches 108). If there is a TLB miss, then the stack cache manager 110 is checked. Note that the stack cache manager 110 may be checked whether or not the data is being allocated in a stack cache or a non-stack data cache. When the stack cache manager 110 includes the translation, a shoot-down is sent to the owning core. If, however, the new translation is intended for a stack cache, then the stack cache manager 110 is updated to reflect the new owner of the cache line. If the stack cache manager 110 access is a miss, then the system assumes that the TLB entry is not in any of the stack caches.

Once the stack cache manager 110 assigns a virtual page to a stack cache, those cache blocks are brought into the stack cache using physical addresses and the standard coherence protocol. Once a block is located in a stack cache, the processor system can guarantee that no accessible copies of the block exist outside of the stack cache because no TLBs contain valid translations to the block outside of the stack cache.

In practice, it is possible for a workload to have many shared entries. Accordingly, the processor system could be provided with a mechanism to keep track of the number of shoot-downs. Thus, if an excessive number of shoot-downs is detected, the processor system can disable the stack caches for those execution cores that are experiencing a high rate of shoot-downs and flushes. In such situations, the stack cache functionality can be temporarily disabled such that the processor system can continue operating using the traditional cache architecture 104.

Figure 4:
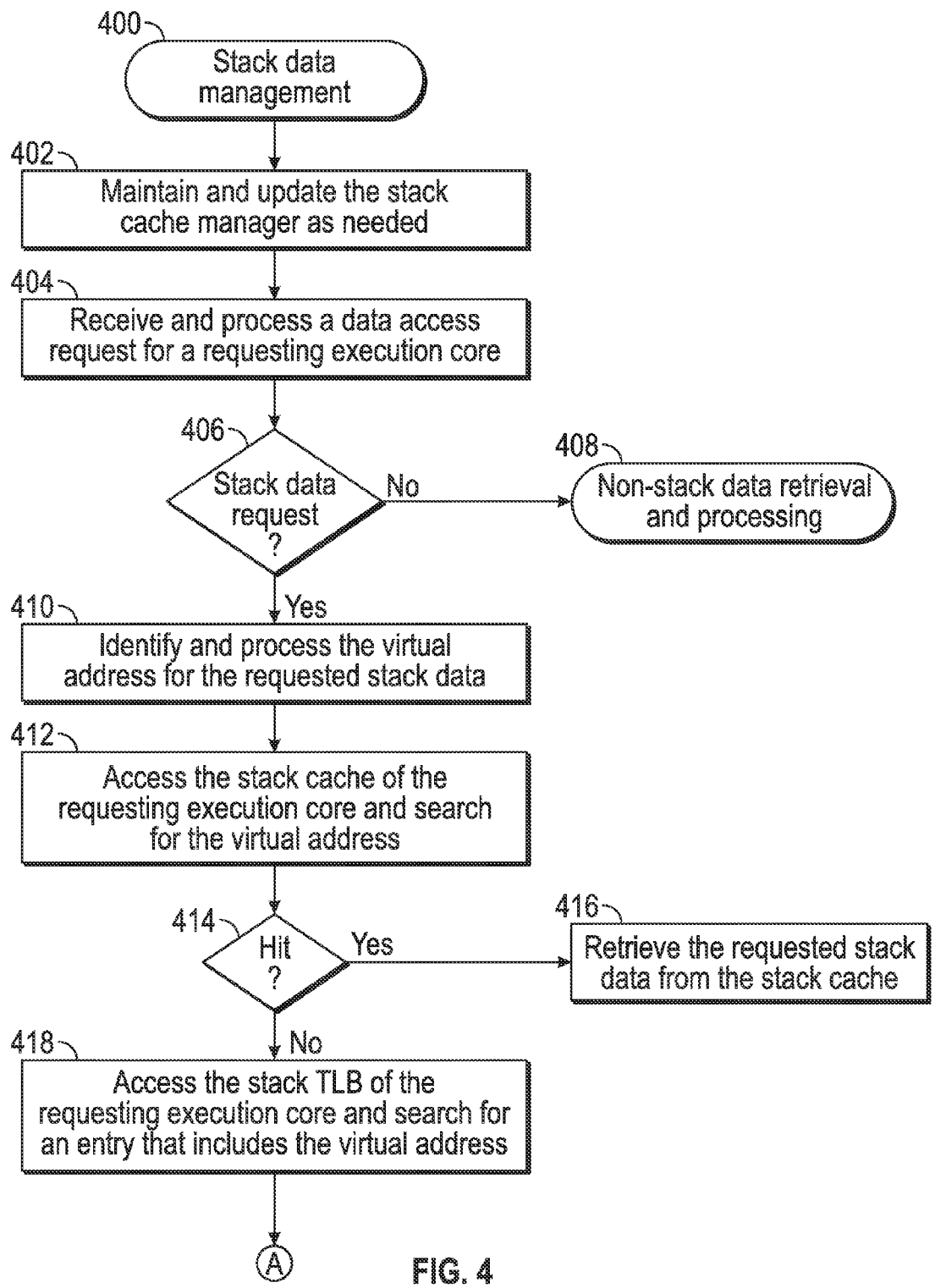
FIG. 4 is a flow chart that illustrates an embodiment of a stack data management process.
Figure 4:
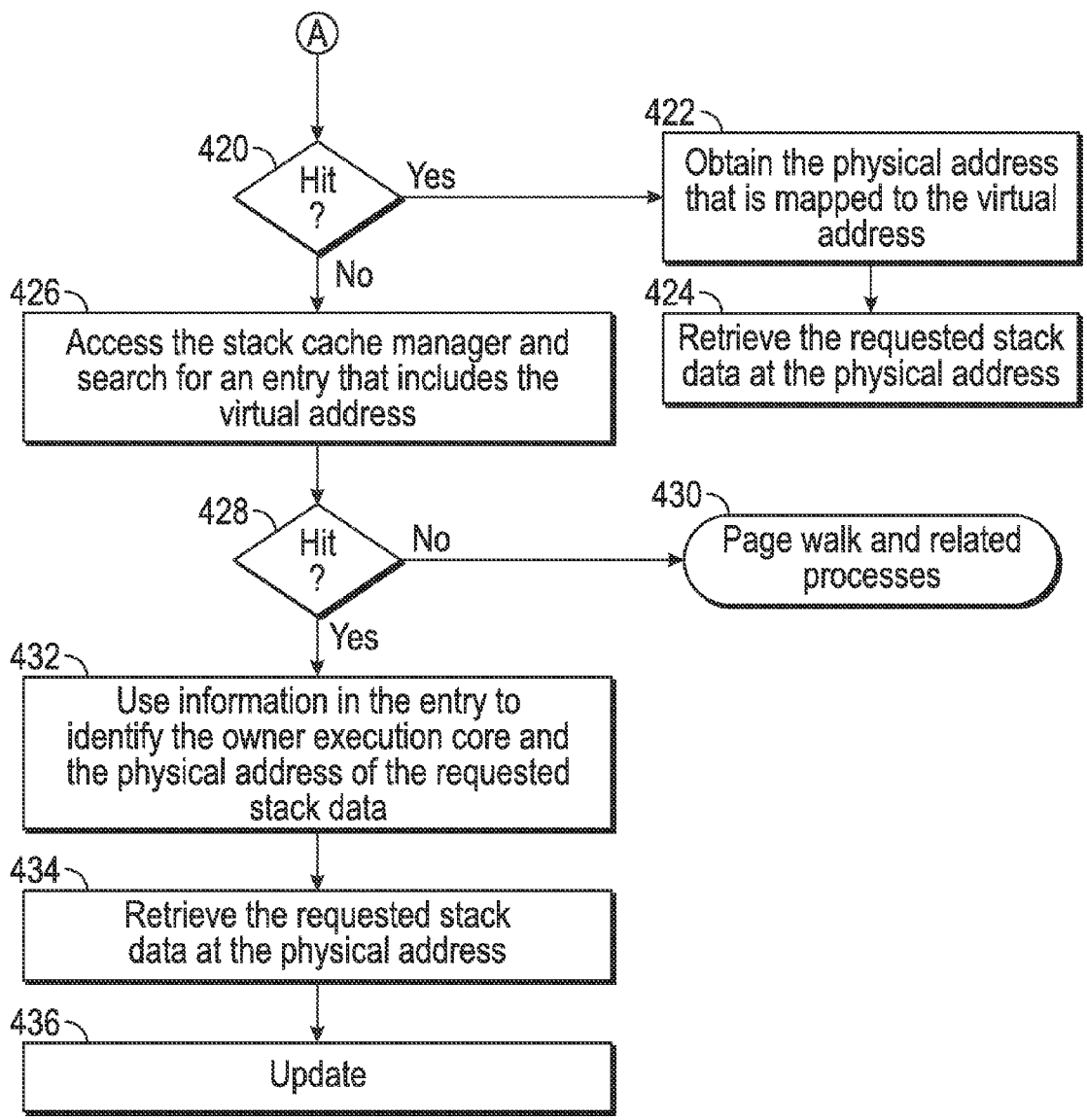
Figure 5:
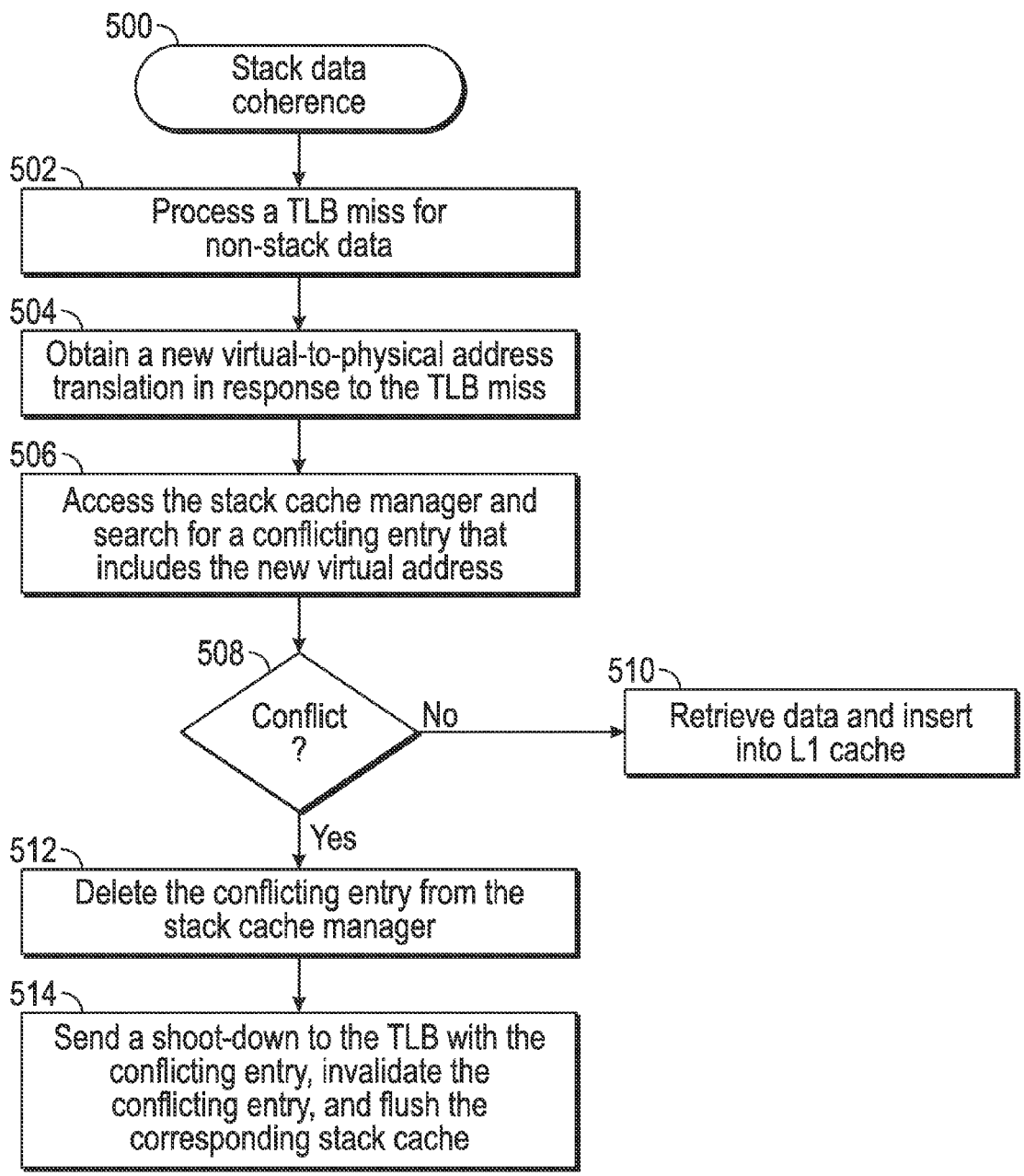
FIG. 5 is a flow chart that illustrates an embodiment of a stack data coherence process.

The processor system 100, 300 described herein may be suitably configured to perform a variety of functions, methods, and operations, many of which are conventional in nature. For example, the processor system 100, 300 can execute instructions stored in the system memory 304, the cache architecture 104, and/or the stack caches 108. In addition to supporting conventional processor-related operations, the processor system 100, 300 is configured to access, retrieve, evict, flush, and otherwise manage the processing of stack data. In this regard, FIG. 4 is a flow chart that illustrates an embodiment of a stack data management process 400 that may be performed by the processor system 100, 300, and FIG. 5 is a flow chart that illustrates an embodiment of a stack data coherence process 500 that may be performed by the processor system 100, 300. The various tasks of a process described herein may be performed by software, hardware, firmware, or any combination thereof. For illustrative purposes, the following description of the processes 400, 500 may refer to elements mentioned above in connection with FIGS. 1-3. In practice, portions of a process presented here may be performed by different elements of the described processor system 100, 300, e.g., an execution core, the memory controller, a stack cache, a TLB, the stack cache manager, or the like. It should be appreciated that a process described herein may include any number of additional or alternative tasks, the tasks shown in the figures need not be performed in the illustrated order, and a described process may be incorporated into a more comprehensive procedure or process having additional functionality not described in detail herein. Moreover, one or more of the tasks shown in a figure could be omitted from an embodiment of the illustrated process as long as the intended overall functionality remains intact.

Referring now to FIG. 4, the stack data management process 400 involves a stack cache manager of the type described above with reference to FIG. 1. Accordingly, the process 400 maintains and updates the stack cache manager as needed (block 402). As mentioned previously, at least one stack cache manager is maintained for the plurality of execution cores in the processor system. For simplicity, this description refers to only one stack cache manager. The stack cache manager maintains status entries (e.g., TLB entries) for at least some of the stack data accessed by the execution cores. In this context, the stack cache manager maintains a list of the virtual pages that are owned by the stack caches.

This example assumes that the process 400 receives and processes a data access request (block 404), where the data access request originates from one of the execution cores. The originating core is referred to herein as the "requesting execution core" to distinguish it from the other execution cores in the processor system. The process 400 may continue by determining whether the obtained data access request represents a request for stack data (query block 406). If the data access request calls for non-stack data (the "No" branch of the query block 406), then the process 400 may exit or initiate an appropriate procedure related to the retrieval and processing of non-stack data (process 408). In connection with the query block 406, the process 400 may determine that the data access request is for non-stack data based at least in part on the address provided with the request. Alternatively, the process 400 may leverage any appropriate decision logic or algorithm to carry out the determination made in connection with the query block 406. Retrieving and processing non-stack data may initially involve the TLB 316 and the L1 cache memory 308 (see FIG. 3) and, if the requested data is not found in the L1 cache memory 308, the processor system can proceed in a conventional fashion to search for the requested data in other locations in the cache hierarchy, the system memory 304, etc.

The following description assumes that the data access request is for stack data (the "Yes" branch of the query block 406). In certain embodiments, stack data is virtually indexed and virtually tagged. Thus, the process 400 identifies and processes the virtual memory address for the requested stack data (block 410). The virtual memory address may be processed as described in more detail herein in an attempt to locate the requested stack data. The virtual address of the requested stack data can be used "directly" to access and search the stack cache of the requesting execution core (block 412). In this regard, the stack cache associated with the requesting execution core is searched in an attempt to find the virtual address of the requested stack data and, consequently, to find the requested stack data itself. In a typical implementation, the stack cache is relatively small (e.g., holding only a few cache lines) and the operation associated with block 412 can be performed quickly and efficiently. If the requested virtual address is found in the stack cache (the "Yes" branch of the query block 414), then the process 400 can retrieve the requested stack data from the stack cache in a conventional manner (block 416) and return the requested stack data to the requesting execution core.

If, however, the process 400 determines that the requested stack data cannot be found in the stack cache, i.e., there is a miss in the stack cache (the "No" branch of the query block 414), then the process 400 may access the stack TLB of the requesting execution core to search for an entry that includes the virtual address (or a portion thereof) of the requested stack data (block 418). Thus, the stack TLB assigned to the requesting execution core is accessed to search for the requested stack data when the virtual address of the stack data is not found in the associated stack cache. As explained previously, the stack TLB is searched in an attempt to find an address translation (virtual-to-physical) for the requested stack data. If the requested virtual address is found in the stack TLB (the "Yes" branch of the query block 420), then the process 400 obtains the corresponding physical address that is mapped to the found virtual address (block 422) and retrieves the requested stack data at the obtained physical address (block 424). The physical address obtained at block 422 may represent a physical address in the cache memory hierarchy, e.g., an address pointing to the L2 cache memory, the L3 cache memory, or the like. Referring again to FIG. 3, the arrow leading from the stack TLB 320 to the L2 cache memory 310 represents this scenario—a hit in the stack TLB 320 results in access to the L2 cache memory 310 via the obtained physical address. It should be appreciated that the obtained physical address need not always point to an L2 cache location. In certain situations a hit in a stack TLB could lead to a physical address location in the L3 cache, or the like. In response to the retrieval of the requested stack data, the process 400 may also update the corresponding stack cache of the requesting execution core such that the requested stack data can be accessed with greater ease the next time.

This example assumes that the process 400 determines that the virtual address of the requested stack data cannot be found in the stack TLB, i.e., there is a miss in the stack TLB (the "No" branch of the query block 420). In response to a stack TLB miss, the process 400 accesses the stack cache manager and searches for an entry that includes the virtual address (or a portion thereof) for the requested stack data (block 426). Thus, the stack cache manager is consulted when the requested stack data cannot be found in the stack cache of the requesting execution core, and when an address translation for the requested stack data cannot be found in the stack TLB assigned to the requesting execution core.

The status entries of the stack cache manager can be searched in an attempt to find a virtual page owned by other stack caches. In other words, the process 400 attempts to locate and identify a status entry (which is akin to a TLB entry maintained by the stack cache manager) corresponding to the requested stack data. If the requested virtual address is not found in the stack cache manager (the "No" branch of the query block 428), then the process 400 may exit or initiate an appropriate page walk procedure and (process 430) in an attempt to find an address translation for the requested stack data. It should be appreciated that the process 430 may leverage well known and conventional page walk techniques and methodologies that need not be described in detail here. Thus, if the page walk process 430 finds an address translation for the requested stack data, the stack cache manager can be updated with the translation. In addition, the translation is inserted into the associated stack TLB, and the requested data is fetched and placed into the stack cache.

The following description assumes that there is a hit in the stack cache manager (the "Yes" branch of the query block 428). In other words, the process 400 locates a status entry in the stack cache manager that includes the virtual address of the requested stack data. As mentioned above with reference to FIG. 2, the located status entry may include information that can be used to search for and retrieve the requested stack data. This information may include, without limitation: the virtual pages owned by the stack caches; an execution core identifier that identifies the execution core of the processor system that is currently designated as the "owner" core for the requested stack data; and, if an execution core has more than one stack cache, a stack cache identifier. The process 400 uses the information in the located status entry to identify the owner execution core and a physical address of the requested stack data (block 432), wherein the obtained physical address is associated with the owner execution core. In this regard, the obtained physical address may be associated with a physical address corresponding to the cache hierarchy for the owner execution core, associated with a physical address corresponding to the stack cache of the owner execution core, or associated with a physical address of some other memory structure that is assigned to the owner execution core.

The process 400 may continue by accessing and retrieving the requested stack data at the obtained physical address (block 434) that points to the cache memory hierarchy. Thus, the requested stack data can be retrieved from the cache memory hierarchy even though the processor system cannot locate the requested stack data in the stack cache associated with the originating execution core, and cannot locate an entry for the requested stack data in the stack TLB associated with the originating execution core. Rather, the process 400 is able to locate and retrieve the requested stack data from a structure or element that is associated with another execution core (other than the originating execution core), in response to a hit in the stack cache manager. In certain scenarios, the requested stack data is retrieved by accessing and searching the stack cache associated with the owner execution core. In practice, therefore, the requested stack data may be accessed and retrieved using some or all of the physical address obtained from the stack cache manager and/or using some or all of the virtual address identified in the data access request (see block 404).

Thereafter, the process 400 may update the various memory structures as needed (block 436). For example, a new status entry could be created in the stack cache manager to identify the current location and owner execution core of the requested stack data. As another example, the appropriate stack TLB could be updated with an entry for the requested stack data. Moreover, before or during such updating, the process 400 will flush the stack cache of the owner execution core and the associated stack TLB.

Referring now to FIG. 5, the stack data coherence process 500 may be performed by the processor system 100, 300 to maintain coherence across the stack caches 108, 318 for the stack data that is accessed by the execution cores. Although conflicts in the stack caches 108, 318 should be rare (due to the private nature of the stack caches 108, 318), the process 500 contemplates conflicts for the sake of completeness.

For this particular example, the process 500 assumes that the processor system has received and processed a request for non-stack data. The process 500 may be initiated by processing a TLB miss for the requested non-stack data (block 502). The TLB miss in this context may refer to a miss in the "main" TLB 316 (see FIG. 3). In response to a TLB miss, the processor system initiates a page walk and obtains a "new" virtual-to-physical address translation for the requested non-stack data (block 504). This new translation is inserted into the appropriate main TLB. In addition, the page walker accesses the stack cache manager to ensure that the inserted translation does not conflict with a current virtual address page maintained by the stack cache manager (block 506). Thus, the process 500 searches the stack cache manager for a conflicting status entry that includes the virtual address of the inserted translation.

If no conflicting entry is discovered (the "No" branch of the query block 508), then the process 500 continues by retrieving the data for the translated physical address and inserting it into the L1 cache (block 510). In contrast, if a conflicting entry is found (the "Yes" branch of the query block 508), then the process 500 continues by deleting the conflicting entry from the stack cache manager (block 512). Thus, the stack cache manager is updated to remove the conflicting reference to the requested stack data. Moreover, the process 500 sends a shoot-down to the owner stack TLB that contains the conflicting entry, invalidates the conflicting entry, and flushes the appropriate stack cache (block 514). The invalidation and flushing operations are necessary to maintain coherence for the stack data. Upon completion of the process 500, the newly created address translation governs, and it ensures that no other stack caches own the virtual page.

Thus, when allocating a new cache entry in any of the caches and when accessing the L1 cache for non-stack data (because the L1 cache is usually physically tagged), a TLB lookup is performed. If there is a TLB miss, the stack cache manager is checked (whether or not the new cache entry is being allocated in a stack cache or a non-stack cache). If the stack cache manager already contains the new address translation, the system sends a shoot-down to the owner execution core. If the new translation is intended for a stack cache, the status entry in the stack cache manager is updated to indicate the new owner core of that cache line. If there is a miss in the stack cache manager, then the system knows that the particular TLB entry does not appear in any of the stack caches.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of managing stack data in a processor system having a plurality of execution cores and a plurality of stack caches, each of the stack caches associated with a different one of the execution cores, the method comprising:
    maintaining a stack cache manager for the plurality of execution cores, the stack cache manager comprising status entries for stack data accessed by the plurality of execution cores;
    accessing the stack cache manager to search for a status entry of the stack cache manager that includes a virtual address for requested stack data for a requesting execution core of the plurality of execution cores; and
    using information in the status entry to retrieve the requested stack data.

2. The method of claim 1, wherein prior to accessing the stack cache manager, the method further comprises:
    accessing a first stack cache of the plurality of stack caches to search for the virtual address, wherein accessing the stack cache manager is performed when the virtual address is not found in the first stack cache and when a corresponding virtual-to-physical address translation is not found in a stack translation lookaside buffer associated with the first stack cache.

3. The method of claim 2, wherein:
    the processor system comprises a plurality of stack translation lookaside buffers (TLBs), each of the stack TLBs associated with a different one of the execution cores; and
    the method further comprises, responsive to the virtual address not being in the first stack cache, accessing a first stack TLB of the plurality of stack TLBs to search for the virtual address.

4. The method of claim 3, wherein accessing the stack cache manager is performed when the virtual address is not found in the first stack TLB.

5. The method of claim 1, wherein using information in the status entry to retrieve the requested stack data comprises:
    identifying, from the status entry, an owner execution core of the plurality of execution cores;
    obtaining a physical address that is mapped to the virtual address, wherein the physical address is associated with the owner execution core; and
    retrieving the requested stack data at the physical address.

6. The method of claim 1, wherein maintaining the stack cache manager comprises:
    maintaining virtual-to-physical address translations for the stack data.

7. A processor system comprising:
    a plurality of execution cores;
    a plurality of stack caches configured to cache stack data for the execution cores;
    a plurality of stack translation lookaside buffers (TLBs) for the execution cores, each of the execution cores having one of the stack caches associated therewith, and each of the plurality of stack caches having one of the stack TLBs associated therewith;
    a cache memory architecture configured to cache data for the execution cores; and
    a stack cache manager operatively associated with the execution cores and operatively associated with the stack caches and the stack TLBs, wherein the stack cache manager maintains status entries for stack data accessed by the execution cores.

8. The processor system of claim 7, further comprising a memory controller operatively associated with the cache memory architecture, wherein the memory controller is configured to control data caching operations that involve the cache memory architecture.

9. The processor system of claim 8, wherein the memory controller is further configured to control data caching operations that involve the stack caches.

10. The processor system of claim 8, wherein the stack cache manager responds to an access request for requested stack data to:
    access a first stack cache of the plurality of stack caches to search for the requested stack data, wherein the first stack cache is associated with a requesting execution core that originated the access request; and when the requested stack data is not found in the first stack cache, access a first stack TLB of the plurality of stack TLBs to search for an address translation for the requested stack data, wherein the first stack TLB is associated with the requesting execution core.

11. The processor system of claim 10, wherein, when an address translation for the requested stack data is not found in the first stack TLB, the stack cache manager responds to:
search the status entries of the stack cache manager for a status entry corresponding to the requested stack data.

12. The processor system of claim 7, wherein:
each of the stack caches is virtually indexed and virtually tagged; and
the status entries maintained by the stack cache manager comprise stack TLB entries that indicate virtual-to-physical address translations for virtual pages owned by the stack caches.

13. The processor system of claim 7, wherein:
each of the status entries maintained by the stack cache manager corresponds to designated stack data that is currently owned by an owner execution core of the plurality of execution cores; and
each of the status entries maintained by the stack cache manager comprises an execution core identifier that indicates the owner execution core.

14. The processor system of claim 7, wherein the stack cache manager maintains coherence, for the stack data accessed by the execution cores, across the stack caches and the cache memory architecture.

15. A method of managing stack data in a processor system having a plurality of execution cores, a plurality of stack caches, a plurality of stack translation lookaside buffers (TLBs), and a stack cache manager, each of the execution cores having one of the stack caches associated therewith, and each of the stack caches having one of the stack TLBs associated therewith, and each of the stack caches associated with a different one of the execution cores, the method comprising:
maintaining, with the stack cache manager, status entries for stack data accessed by the execution cores;
obtaining an access request for requested stack data, the access request originating from a first execution core of the plurality of execution cores, and the access request identifying a virtual memory address for the requested stack data, wherein the first execution core is associated with a first stack cache of the plurality of stack caches and is associated with a first stack TLB of the plurality of stack TLBs;
determining that the requested stack data cannot be found in the first stack cache, and that an address translation for the virtual memory address cannot be found in the first stack TLB; and
in response to the determining, searching the stack cache manager to locate a status entry for the requested stack data; and retrieving the requested stack data in response to locating the status entry for the requested stack data.

16. The method of claim 15, wherein:
the located status entry includes an execution core identifier that identifies a second execution core of the plurality of execution cores, wherein the second execution core is associated with a second stack cache of the plurality of stack caches; and
retrieving the requested stack data comprises accessing the second stack cache to search for the requested stack data.

17. The method of claim 15, wherein:
the located status entry includes an execution core identifier that identifies a second execution core of the plurality of execution cores, wherein the second execution core is associated with a second stack TLB of the plurality of stack TLBs; and
retrieving the requested stack data comprises accessing the second stack TLB to search for an address translation for the virtual memory address.

18. The method of claim 17, further comprising:
obtaining a physical address that is mapped to the virtual memory address, wherein the requested stack data is retrieved from the obtained physical address.

19. The method of claim 17, wherein:
each of the stack caches is virtually indexed and virtually tagged; and
the status entries maintained with the stack cache manager comprise stack TLB entries that indicate virtual-to-physical address translations for virtual pages owned by the stack caches.

20. The method of claim 17, further comprising:
maintaining coherence, for the stack data accessed by the execution cores, across the stack caches.

21. The method of claim 20, wherein maintaining coherence comprises:
finding that another stack cache other than the first stack cache owns a requested virtual page; and
in response to the finding, flushing the first stack TLB and the first stack cache, and updating the stack cache manager.

22. The method of claim 20, wherein maintaining coherence comprises:
obtaining a non-stack access request for non-stack data;
detecting a miss for the non-stack access request in a main TLB of the processor system;
obtaining a new virtual-to-physical address translation in response to detecting the miss for the non-stack access request; and
searching the stack cache manager for a conflicting entry corresponding to the new virtual-to-physical address translation.

* * * * *